United States Patent
Gagnon et al.

[11] Patent Number: 6,138,930
[45] Date of Patent: Oct. 31, 2000

[54] APPARATUS FOR REMOVING ICE FROM THE CABLES OF ELECTRIC POWER TRANSMISSION LINES

[76] Inventors: Maurice Gagnon, 159 Rang St-Joseph; Nicolas Tremblay, 185 Rang St-Joseph, both of St-Fulgence, Quebec, Canada, G0V 1S0

[21] Appl. No.: 09/393,625
[22] Filed: Sep. 10, 1999
[30] Foreign Application Priority Data Sep. 11, 1998 [CA] Canada .................................. 2246945

[51] Int. Cl.[7] .................................................. B02C 19/12
[52] U.S. Cl. ............................ 241/36; 241/283; 241/301; 241/DIG. 17
[58] Field of Search ................. 299/24; 241/1, 241/301, 283, DIG. 17, 36; 173/90

[56] References Cited

U.S. PATENT DOCUMENTS 4,809,787   3/1989   McCauley .................................. 173/90

*Primary Examiner*—Mark Rosenbaum
*Attorney, Agent, or Firm*—Birch, Stewart, Kolasch & Birch, LLP

[57] ABSTRACT

An apparatus for removing ice from an electric cable is disclosed. This apparatus comprises an impact actuator, an impact member in the from of a rod, and a fastener to hang the apparatus from the electric cable. The apparatus can be remotely activated and can be activated many times before reloading. Triggering of the impact actuator produces an impact between the rod and the electric cable suitable to produce a shock wave that propagates along the electric cable to cause the accumulated ice to break and fall on the ground.

18 Claims, 2 Drawing Sheets

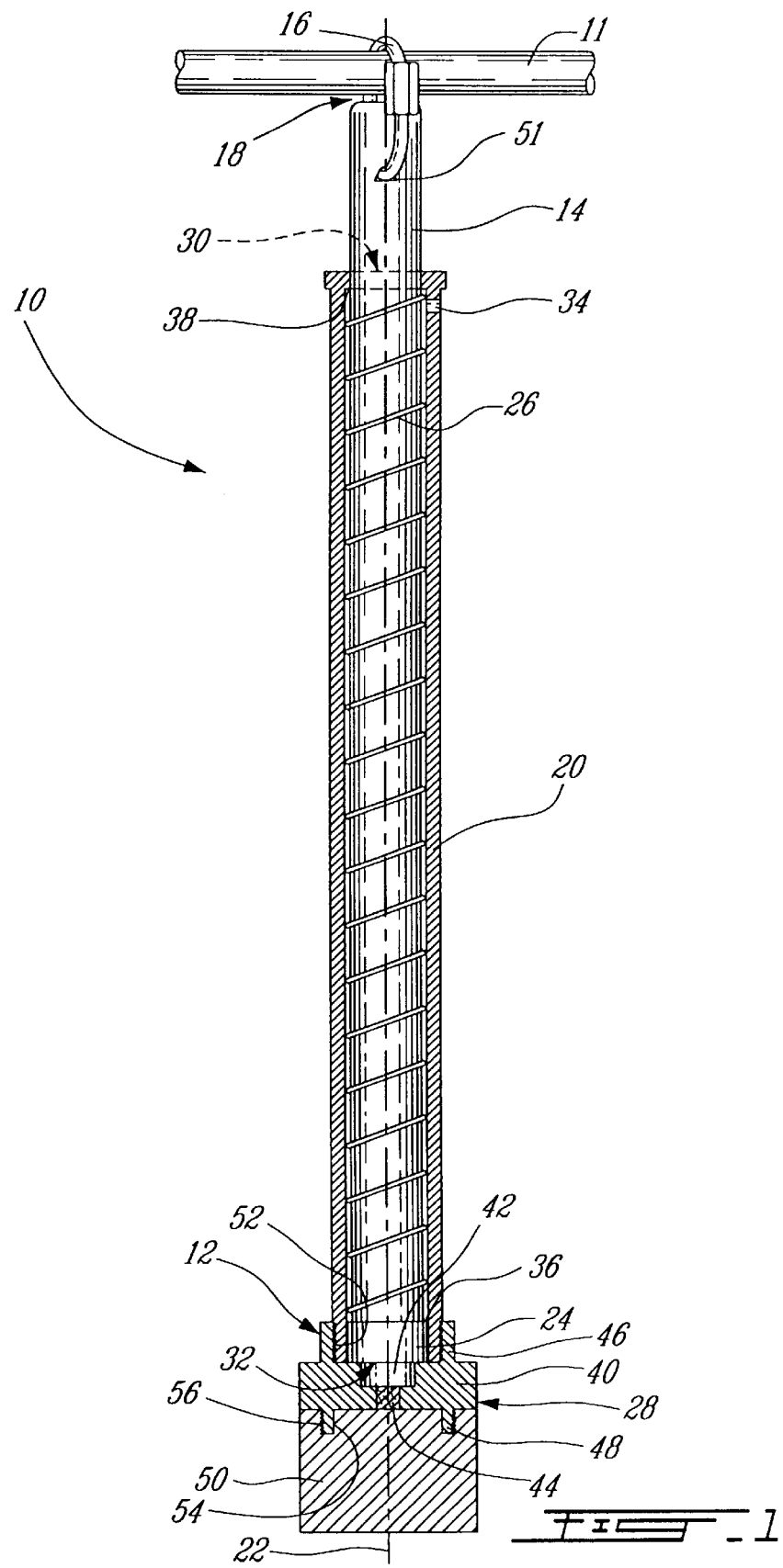

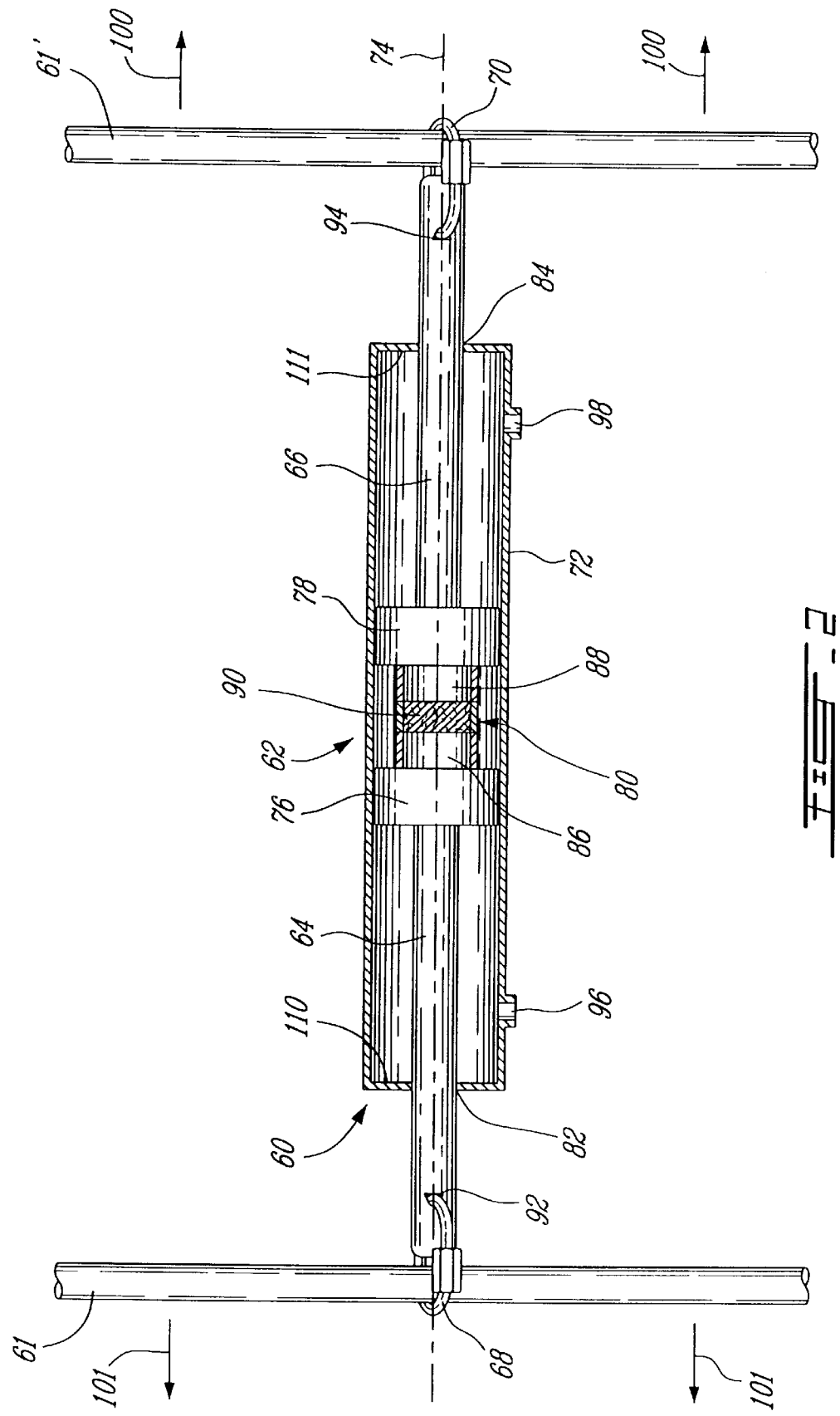

APPARATUS FOR REMOVING ICE FROM THE CABLES OF ELECTRIC POWER TRANSMISSION LINES

FIELD OF THE INVENTION

The present invention pertains to an apparatus for removing ice from the cables of electric power transmission lines.

BACKGROUND OF THE INVENTION

One of the problems of electric power transmission networks in northern countries is their vulnerability to hazardous weather conditions such as ice storms. During ice storms, freezing rain produces ice which accumulates on the electric cables of the power transmission lines. When the weight of this ice oversteps the mechanical capacity of the power transmission lines, cables, towers and/or poles break and fall. Reconstruction of the power transmission lines is very costly, both in terms of new equipments and human resources. Moreover, the population suffers from the power shutdown which follows. Accordingly, there exists a need to protect electric power transmission lines against freezing rain.

Presently, the only known method available to remove ice from an electric cable is to hit that cable with a hammer or other tool. This technique is far from being practical and cannot be used in many situations. For example, it cannot be used with long sections of cable covered with ice. Furthermore, it is, in most of the cases, already too late for any human response when freezing rain begins to fall.

OBJECT OF THE INVENTION

An object of the present invention is therefore to provide an apparatus for removing ice from electric cables.

SUMMARY OF THE INVENTION

More specifically, in accordance with the present invention, there is provided an apparatus for removing ice from an electric cable comprising:

an impact member;

an impact actuator for projecting the impact member on the electric cable; and an ice removing apparatus and electric cable interconnecting fastener for placing the electric cable in a trajectory of the impact member and thereby cause a collision between the impact member and the electric cable when the impact member is projected by the impact actuator;

whereby the impact between the impact member and the electric cable produces a shock wave propagating along the electric cable to cause the ice to break and fall from the electric cable.

According to another aspect of the present invention, there is provided an apparatus for removing ice simultaneously from two adjacent electric cables, comprising:

two impact members;

an impact actuator for projecting the two impact members on the two adjacent electric cables, respectively; and two ice removing apparatus and electric cable interconnecting fasteners for securing the two impact members to the two adjacent electric cables, respectively, and for placing the two electric cables in the trajectories of the two impact members, respectively, to thereby cause a collision between the two impact members and the two adjacent electric cables, respectively, when the two impacts members are projected by the impact actuator;

whereby the impacts between the impact members and the two adjacent electric cables produce shock waves propagating along the adjacent electric cables to cause accumulated ice to break and fall from the two adjacent electric cables.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is a side elevational, partially cross sectional view of a first preferred embodiment of the ice removing apparatus according to the present invention, hung to an electric cable of power transmission line; and FIG. 2 is a side elevational, partially cross sectional view of a second preferred embodiment of the ice removing apparatus according to the present invention, attached to two adjacent cables of a power transmission line.

DESCRIPTION OF THE PREFERRED EMBODIMENTS

FIG. 1 of the appended drawings illustrates an apparatus 10 for removing ice from an electric cable 11 of power transmission line (not shown), according to the first preferred embodiment of the present invention.

The apparatus 10 comprises an impact actuator 12, an impact member in the form of a rod 14 and a fastener, in the form of a screw ring 16, to interconnect the ice removing apparatus 10 to the electric cable 11.

The impact actuator 12 includes a hollow cylinder 20, centered about a longitudinal axis 22, a piston 24, a biasing member for the piston 24 in the form of a compression spring 26 and a triggering assembly 28.

The cylinder 20 includes upper and lower end apertures 30,32 and a side aperture 34 close to the upper end aperture 30. The outer surface of cylinder 20 includes a lower threaded section 36 close to the lower end aperture 32 to receive the triggering assembly 28.

The rod 14 is preferably integral with the piston 24, but can be secured thereto, for example, by welding. The rod 14 is coaxially mounted in cylinder 20. Rod 14 and piston 24 are configured and sized to reciprocate along the longitudinal axis 22 in the cylinder 20. The rod 14 is also dimensioned to snugly fit in the upper end aperture 30, thus preventing radial movements of the rod 14 in this aperture 30.

The compression spring 26 is coaxially mounted on the rod 14. The diameter of the piston 24 is slightly larger than the diameter of the rod 14, thus creating a circular shoulder 36 on which the lower end of the spring 26 rests. Similarly, the cylinder 20 defines an inner circular shoulder 38 around the upper end aperture 30. The upper end of the spring 26 rests on this circular shoulder 38. Since the lower end of the compression spring 26 applies a downward force to the shoulder 36 and the lower end of the compression spring applies an upward force to the shoulder 38, the relative neutral positions of the rod 14 and cylinder 20 are those illustrated in FIG. 1. More specifically, the compression spring 26 forces rod 14 along with piston 24 inside the cylinder 20 until piston 24 applies to body 40 of a triggering assembly 28.

The body 40 of the triggering assembly 28 comprises a combustion chamber 42 opening on the top surface of body 40. Accordingly, the combustion chamber 42 opens toward piston 24. The triggering assembly 28 further comprises a detonation mechanism 44 located in a cavity of body 40 interconnecting the underside of body 40 and the combustion chamber 42, whereby the detonation mechanism 44 is accessible from the underside of the body 40.

The detonation mechanism 44 is preferably a ramset, but can be any other mechanism capable of propelling upwardly the piston 24. An example of such other mechanism is an air gun.

Body 40 comprises upper and lower cylindrical and coaxial mounting flanges 46 and 48 formed integral with the body 40. The upper cylindrical mounting flange 46 has an inner threaded surface 52 screwed on the lower threaded section 36 of the cylinder 20 to secure the triggering assembly 28 to the hollow cylinder 20. The threaded surface 52 and section 36 also form a sealed joint.

The counterweight 50 includes a top face formed with a cylindrical groove 54. Groove 54 comprises a cylindrical surface of larger diameter which is threaded. The lower cylindrical mounting flange 48 has a threaded outer surface 56 on which the cylindrical threaded surface of larger diameter of groove 54 is screwed to removably secure the counterweight 50 to the body 40 of the triggering assembly 28. Removal of the counterweight 50 enables access to the detonation mechanism 44 and, therefore, loading of the detonation mechanism 44.

A control unit (not shown) to control the triggering assembly 28 is preferably located in the counterweight 50. The control unit is connected to a detector (not shown) capable of detecting the presence of ice on the electric cable 11.

The upper end of the rod 14, located on the outside of cylinder 20, includes a transversal aperture 51. The screw ring 16 is inserted in aperture 51 and defines an opening large enough to receive the electric cable 11. The screw ring 16 is then closed to complete the assembly. The screw ring 16 is further configured and sized to provide a gap 18 between the electric cable 11 and the free end of rod 14.

It is believed to be within the capacity of those of ordinary skill in the art to design other forms of fasteners capable of attaching the rod 14 to the electric cable 11 while placing the electric cable 11 in a trajectory of the rod 14.

In operation, the apparatus 10 is first attached to an electric cable 11 via the fastener 16 so as to hang apparatus 10 from cable 11. The compression spring 26 then sets the rod 14 and cylinder 20 in their neutral position of FIG. 1. When a predetermined amount of ice covers the cable 11, a signal is sent from a remote detector (not shown) to the control unit (not shown) that, in turn, sends a signal to trigger the detonation mechanism 44.

An explosion is then produced to push gases violently out of the combustion chamber 42, to thereby push through the piston 24 the rod 14 toward the electric cable 11. The compression spring 26 is thereby compressed. The impact between the free end of the rod 14 and the electric cable 11 produces a shock wave that propagates along the electric cable 11, causing the accumulated ice to break and fall on the ground.

During longitudinal movement of the piston 24 in the cylinder 20, air inside the cylinder 20 is evacuated through the side aperture 34.

After the impact, the energy stored in the compression spring 26 brings the piston 24 and the rod 14 back to their neutral positions of FIG. 1. The apparatus 10 is then set to trigger another shock wave as soon as another signal is received by the control unit. Preferably, the detonation mechanism will be automatically reloaded.

Those of ordinary skill in the art will also appreciate that the function of the counterweight 50 is to maximize the force of the impact of the upper free end of the rod 14 on the cable 46 by means of its inertia offering a resistance to downward movement of the apparatus 10. For that purpose, the mass of the counterweight 50 will be advantageously greater than the overall mass of the rest of the apparatus 10.

It is believed to be within the capacity of those of ordinary skill in the art to design suitable detonation mechanism, remote ice detector, control unit and automatic detonation mechanism reloading system to put the present invention into practice. Accordingly, the present specification will not further describe these components.

Of course, the counterweight 50, the body 40, the piston 24 and the cylinder 20 will be made of material(s) capable of sustaining the detonation produced by the mechanism 44.

FIG. 2 illustrates an apparatus 60 for removing ice simultaneously from a pair of longitudinally adjacent electric cables 61 and 61' of an electric power transmission line, according to the second preferred embodiment of the present invention.

Apparatus 60 comprises an impact actuator 62, two impact members in the form of rods 64 and 66, and two fasteners in the form of screw rings 68 and 70.

The impact actuator 62 includes a hollow cylinder 72 centered about a longitudinal axis 74, two pistons 76 and 78 positioned coaxially inside the hollow cylinder 72, and a triggering assembly 80.

The hollow cylinder 72 includes first and second end apertures 82 and 84, and two side apertures 96 and 98 close to the end apertures 82 and 84, respectively.

The hollow cylinder 72 also includes an additional aperture (not shown) which can be opened and closed to provide access to the inside mechanism and also to allow loading of the triggering assembly 80.

The rods 64 and 66 are preferably integral with their respective pistons 76 and 78, but can be secured thereto, for example, by welding. The rods 64 and 66 and the pistons 76 and 78 are coaxially mounted in the hollow cylinder 72 for reciprocation along the longitudinal axis 74.

The two end apertures 82 and 84 are smaller than the pistons 76 and 78, thus preventing withdrawing of the pistons 76 and 78 from the hollow cylinder 72. More specifically, the hollow cylinder 72 defines a first annular shoulder 110 around end aperture 82 to retain piston 76 inside this hollow cylinder 72, and a second annular shoulder 111 around the end aperture 84 to retain piston 78 inside hollow cylinder 72. Of course, rods 64 and 66 are configured and sized to snugly fit in the two end apertures 82 and 84, respectively, thus preventing radial movement of the rods 64 and 66 in the respective end apertures 82 and 84.

The triggering assembly 80 is secured in the center of the hollow cylinder 72, between the pistons 76 and 78, by welding or another type of connection (not shown). The triggering assembly 80 includes two combustion chambers 86 and 88 and a detonation mechanism 90, similar to the detonation mechanism 44 of the apparatus 10 as illustrated in FIG. 1.

Each of the rods 64 and 66 includes transversal apertures 92 and 94 to receive screw rings 68 and 70, respectively. As can be seen in the drawings, screw rings 68 and 70 are similar to screw ring 16 of the apparatus 10 as illustrated in FIG. 1.

In operation, the apparatus 60 is first attached to the two electric cables 61 and 61' via the screw rings 68 and 70. The method of triggering the detonation mechanism 90 is the same as described hereinabove with reference to the detonation mechanism 44 of the apparatus 10. The explosion pushes gases violently out of the two combustion chambers 86 and 88, to thereby push both rods 64 and 66 via the respective pistons 76 and 78, in directions 101 and 100, respectively, i.e. toward cables 61 and 61', respectively.

Unlike apparatus 10, apparatus 60 does not include any compression spring. The rods 64 and 66, and therefore the cables 61 and 61', are then free to oscillate under the impact, causing the accumulated ice to break and fall onto the ground. The side apertures 96 and 98 enables air to flow freely in the hollow cylinder 72. Pistons 76 and 78 are then free to reciprocate longitudinally within the hollow cylinder 72.

When the oscillations stop, the pistons 76 and 78 return to their neutral positions, in contact with the combustion chambers 86 and 88, respectively.

It should be noted that, unlike apparatus 10, the apparatus 60 does not require any counterweight since the respective free ends of the rods 64 and 66 are connected to the cables 61 and 61'.

For both apparatuses 10 and 60, the fasteners and the impact member are preferably covered by a resilient insulating material, such as for example rubber and/or plastic material, to prevent both short circuits and damages to the power transmission equipments. Such an insulating material will also help to prevent longitudinal movements of the ice removing apparatus along the electric power transmission line. The fasteners can also be configured to prevent such movements.

It should also be noted that the ice detector may take many forms, from a scale that weights the accumulation of ice on the cable, to a satellite-photography prospecting system. Depending on the triggering device used and the sizes of both the rods and the cables, the ice removing apparatus according to the present invention can be installed at different distances from one another to produce a network of cable protecting devices that can be triggered separately or by groups.

Also, depending of the triggering assembly being installed, several impacts can be produced without the need to recharge the apparatus.

Although the present invention has been described hereinabove by way of preferred embodiments thereof, it can be modified at will within the scope of the appended claims without departing from the spirit and nature of the subject invention.

What is claimed is:

1. An apparatus for removing ice from an electric cable comprising:
    an impact member;
    an impact actuator for projecting the impact member on the electric cable; and
    an ice removing apparatus and electric cable interconnecting fastener for placing the electric cable in a trajectory of the impact member and thereby cause a collision between the impact member and the electric cable when the impact member is projected by the impact actuator;
    whereby the impact between the impact member and the electric cable produces a shock wave propagating along the electric cable to cause the ice to break and fall from the electric cable.

2. An apparatus as recited in claim 1, wherein:
    the impact actuator includes a hollow cylinder and a reciprocating piston mounted in said hollow cylinder; and
    the impact member is secured to said piston.

3. An apparatus as recited in claim 2, wherein:
    the hollow cylinder includes an end aperture formed with a shoulder; and
    the impact actuator further includes a biasing member interposed between said shoulder and said piston to bring the piston in a neutral position when no external forces is exerted on said piston.

4. An apparatus as recited in claim 3, wherein:
    the impact actuator further includes a combustion chamber on a side of the piston opposite to the end aperture, and a detonation mechanism for producing a small explosion in the combustion chamber; and
    the combustion chamber is located adjacent to the piston whereby the small explosion pushes gases violently out of the combustion chamber to thereby push said piston toward the end aperture.

5. An apparatus as recited in claim 4, wherein said detonation mechanism includes a ramset.

6. An apparatus as recited in claim 4, wherein said detonation mechanism includes an air gun.

7. An apparatus as recited in claim 4, wherein said impact actuator further includes a counterweight.

8. An apparatus as recited in claim 3, wherein said biasing member comprises a compression spring located between the shoulder and the piston.

9. An apparatus as recited in claim 2, wherein said impact member and said piston are integral with each other.

10. An apparatus as recited in claim 2, wherein said impact member comprises a rod.

11. An apparatus as recited in claim 3, wherein said impact member comprises a rod connected to the piston and extending through said end aperture, said rod having a free end connected to the electric cable through said fastener.

12. An apparatus as recited in claim 1, further comprising a control unit for triggering the impact actuator.

13. An apparatus as recited in claim 12, further comprising an ice detector for detecting accumulation of ice onto the electric cable and for sending a signal to said control unit.

14. An apparatus as recited in claim 11, wherein said fastener comprises a screw ring.

15. An apparatus for removing ice simultaneously from two adjacent electric cables, comprising:
    two impact members;
    an impact actuator for projecting the two impact members on the two adjacent electric cables, respectively; and
    two ice removing apparatus and electric cable interconnecting fasteners for securing the two impact members to the two adjacent electric cables, respectively, and for placing the two electric cables in the trajectories of the two impact members, respectively, to thereby cause a collision between the two impact members and the two adjacent electric cables, respectively, when the two impacts members are projected by the impact actuator;
    whereby the impacts between said impact members and the two adjacent electric cables produce shock waves propagating along the adjacent electric cables to cause accumulated ice to break and fall from the two adjacent electric cables.

16. An apparatus as recited in claim 15, wherein:
    the impact actuator includes a hollow cylinder and two reciprocating pistons mounted in said hollow cylinder; and the two impact members are secured to the two pistons, respectively.

17. An apparatus as recited in claim 16, wherein:

the hollow cylinder includes first and second opposite end apertures;

the impact actuator includes a piston-projecting device located between the two pistons; and each impact member comprises a rod connected to the corresponding piston on one side of the piston opposite to the piston-projecting device, said rod extending through the end aperture located on said one side of the piston and comprising a free end connected to the corresponding electric cable through the corresponding fastener.

18. An apparatus as recited in claim 15, further comprising a control unit to trigger said impact actuator, and an ice detector for detecting accumulation of ice on the electric cables and for sending a signal to said control unit.

* * * * *